(12) United States Patent
Faruque et al.

(10) Patent No.: US 11,135,992 B2
(45) Date of Patent: Oct. 5, 2021

(54) VEHICLE ROOF AIRBAG

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 18 days.

(21) Appl. No.: 16/750,582

(22) Filed: Jan. 23, 2020

(65) Prior Publication Data

US 2021/0229619 A1 Jul. 29, 2021

(51) Int. Cl.
 *B60R 21/214* (2011.01)
 *B60R 21/232* (2011.01)
 *B60R 21/217* (2011.01)

(52) U.S. Cl.
 CPC .......... *B60R 21/214* (2013.01); *B60R 21/217* (2013.01); *B60R 21/232* (2013.01)

(58) Field of Classification Search
 CPC .... B60R 21/214; B60R 21/232; B60R 21/217
 See application file for complete search history.

(56) References Cited

U.S. PATENT DOCUMENTS

| | | | |
|---|---|---|---|
| 3,795,412 A | 3/1974 | John | |
| 4,536,008 A * | 8/1985 | Brown, Jr. | ............ B60R 21/213 280/730.1 |
| 6,896,288 B2 | 5/2005 | Tanaka et al. | |
| 7,000,944 B2 | 2/2006 | Bakhsh et al. | |
| 7,874,576 B2 | 1/2011 | Gandhi | |
| 7,997,615 B2 | 8/2011 | Jang | |
| 8,087,690 B2 | 1/2012 | Kim | |
| 9,272,682 B2 | 3/2016 | Wang et al. | |
| 9,428,138 B2 | 8/2016 | Farooq et al. | |
| 9,446,735 B1 * | 9/2016 | Jayasuriya | ............ B60R 21/232 |
| 9,789,840 B2 | 10/2017 | Farooq et al. | |
| 9,994,182 B1 * | 6/2018 | Jaradi | ................... B60R 21/232 |
| 10,730,470 B2 * | 8/2020 | Choi | ..................... B60R 21/214 |
| 2005/0040667 A1 * | 2/2005 | Schneider | ............. B60R 21/214 296/97.12 |
| 2019/0047503 A1 | 2/2019 | Faruque et al. | |
| 2020/0070763 A1 * | 3/2020 | Hill | ...................... B60R 21/233 |
| 2020/0086820 A1 * | 3/2020 | Gould | ................... B60R 21/232 |
| 2020/0223387 A1 * | 7/2020 | Min | ................... B60R 21/2338 |

* cited by examiner

*Primary Examiner* — Drew J Brown
(74) *Attorney, Agent, or Firm* — Frank A. MacKenzie; Bejin Bieneman PLC

(57) ABSTRACT

An assembly includes a roof rail, a linkage supported by the roof rail, and an airbag supported by the linkage. The linkage includes a plurality of links that are rotatable relative to the roof rail.

20 Claims, 6 Drawing Sheets

VEHICLE ROOF AIRBAG

BACKGROUND

An interior of a vehicle, such as an automobile, may include various devices for absorbing energy from an occupant of the vehicle during an impact. For example, the vehicle may include an airbag supported by a vehicle seat. The airbag may be configured to absorb energy from the occupant during the impact.

Energy absorbers may be passive, e.g., not activated before impact, or may be active, e.g., deployed when an impact is sensed. Active energy absorbers are desired for some applications in the interior of the vehicle. During the impact, the occupant may move forward in the vehicle toward a vehicle component, e.g., a seat, a pillar, etc.

DETAILED DESCRIPTION

Figure 1:
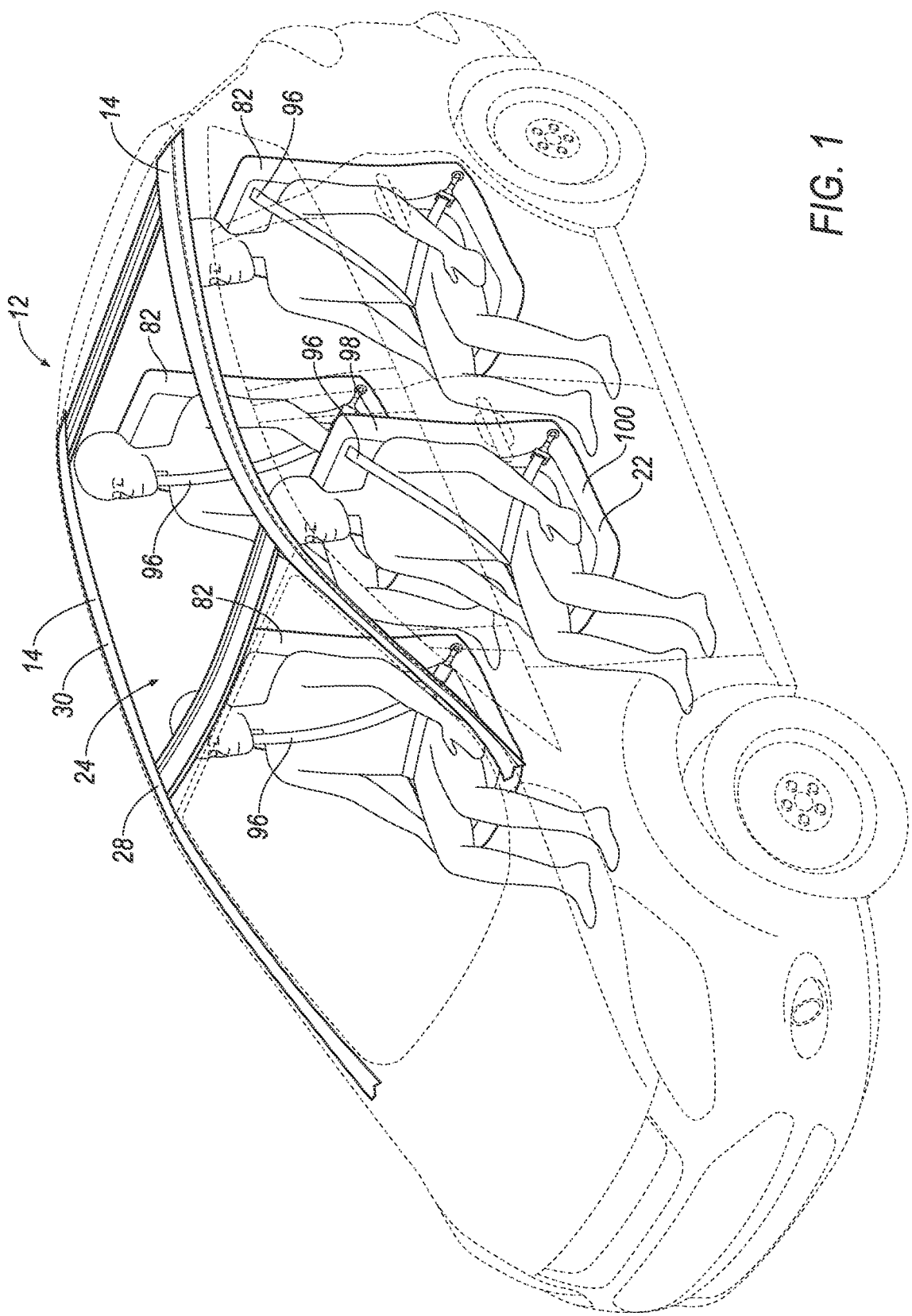
FIG. 1 is a perspective view of a vehicle.

An assembly includes a roof rail, a linkage supported by the roof rail, the linkage including a plurality of links that are rotatable relative to the roof rail, and an airbag supported by the linkage.

The assembly may further include a track extending along the roof rail, wherein the linkage has a first end slidably connected to the track and a second end rotatably connected to the roof rail, the second end being fixed along the rail.

The plurality of links may include a first link and a second link, the first link being rotatably connected to the second link.

The linkage may be rotatable from a stowed position to a deployed position, wherein the linkage may include a stop between the first link to the second link and stopping relative rotation of the first link and the second link in the deployed position.

The plurality of links may include a third link, the first link being rotatably connected to the roof rail and rotatably connected to the second link, the second link being rotatably connected to the third link, and the third link being slidably connected to the roof rail.

The linkage may be rotatable from a stowed position to a deployed position, wherein the linkage may include a stop between the first link to the second link and stopping relative rotation of the first link and the second link in the deployed position and a second stop between the second link to the third link and stopping relative rotation of the second link and the third link in the deployed position.

The assembly may further include an actuator including a cable, the actuator supported by the roof rail, wherein the third link has a first end rotatably connected to the second link and a second end slidably connected to the roof rail and the cable is attached to the second end of the third link.

The assembly may further include a track extending along the roof rail having a distal end and a proximal end, wherein the second end of the third link may be slidably connected to the track and the cable is arranged to slide the second end of the third link along the track from the distal end to the proximal end.

The linkage may be rotatable from a stowed position to a deployed position, wherein when the second end of the third link is at the proximal end of the track, the linkage is in the deployed position.

The airbag may extend along the roof rail, the first link, the second link, and the third link.

The assembly may further include a vehicle seat and a second vehicle seat, wherein the linkage may be rotatable from a stowed position to a deployed position, wherein when the linkage is in the deployed position, the linkage may extend around the vehicle seat and the airbag may extend around the vehicle seat and between the vehicle seat and the second vehicle seat.

The assembly may further include a second linkage supported by the roof rail including a plurality of links and rotatable from a stowed position to a deployed position and a second airbag supported by the second linkage and inflatable to an inflated position when the second linkage is in the deployed position, wherein when the second linkage is in the deployed position, the second airbag extends around the second vehicle seat and between the vehicle seat and the second vehicle seat.

The airbag may include an uninflatable portion mounted to the linkage and an inflatable portion extending from the uninflatable portion.

The assembly may further include an inflator and a fill tube, the inflator supported by the roof rail and the fill tube extending from the inflator along the uninflatable portion to the inflatable portion.

The linkage may be rotatable from a stowed position to a deployed position and the linkage extends away from the roof rail along a cross-vehicle direction in the deployed position.

The assembly may further include a vehicle seat, wherein the airbag is inflatable to an inflated position in which the airbag extends around the vehicle seat.

The linkage may be rotatable toward a longitudinal center line of a vehicle.

The airbag may be inflatable from an uninflated position in which the airbag extends along the linkage and the roof rail.

The assembly may further include a headliner supported by the roof rail, wherein the linkage may be rotatable from a stowed position to a deployed position and the linkage may be in the stowed position is disposed between the roof rail and the headliner and the linkage extends away from the headliner in the deployed position.

The assembly may further include an actuator, the actuator supported by the roof rail and arranged to rotate the linkage relative to the roof rail.

With reference to the Figures, wherein like numerals indicate like parts throughout the several views, an assembly 10, 10', 10" in a vehicle 12 includes a roof rail 14, a linkage 16 supported by the roof rail 14, and an airbag 18, 18' supported by the linkage 16. The linkage 16, includes a plurality of links 20 that are rotatable relative to the roof rail 14.

Deploying the linkage 16 and the airbag 18, 18' from the roof rail 14 around a vehicle seat 22 may control kinematics of an occupant in the vehicle seat 22 during a vehicle impact. Installing the linkage 16 to the roof rail 14 allows the linkage 16 and the airbag 18, 18' to deploy out to the occupants in the vehicle seat 22 a passenger cabin 24 without additional support from the roof rail 14. Because the linkage 16 is supported by the roof rail 14, the linkage 16 and the airbag 18, 18' remain out of sight of occupants in the passenger cabin 24 prior to deployment. The airbag 18, 18' extends over a seat back 98 of the vehicle seat 22 and the occupant in the vehicle seat 22. An actuator 26 can deploy the linkage 16 upon receiving a signal from an impact sensor detecting the impact to facilitate timely deployment of the linkage 16 and the airbag 18, 18'. The linkage 16 and the airbag 18, 18' may control kinematics of belted and unbelted occupants in the seats 22 during the impact.

The vehicle 12 includes a body 28, as shown in FIG. 1. The body 28 and a frame may be of a unibody construction. In the unibody construction, the body 28, e.g., rockers, serves as the vehicle frame, and the body 28 (including the rockers, pillars, roof rails, etc.) is unitary, i.e., a continuous one-piece unit. As another example, the body 28 and frame may have a body-on-frame construction (also referred to as a cab-on-frame construction). In other words, the body 28 and frame are separate components, i.e., are modular, and the body is supported on and affixed to the frame. Alternatively, the body 28 and frame may have any suitable construction. The body 28 and/or the frame may be formed of any suitable material, for example, steel, aluminum, etc.

Figure 2:
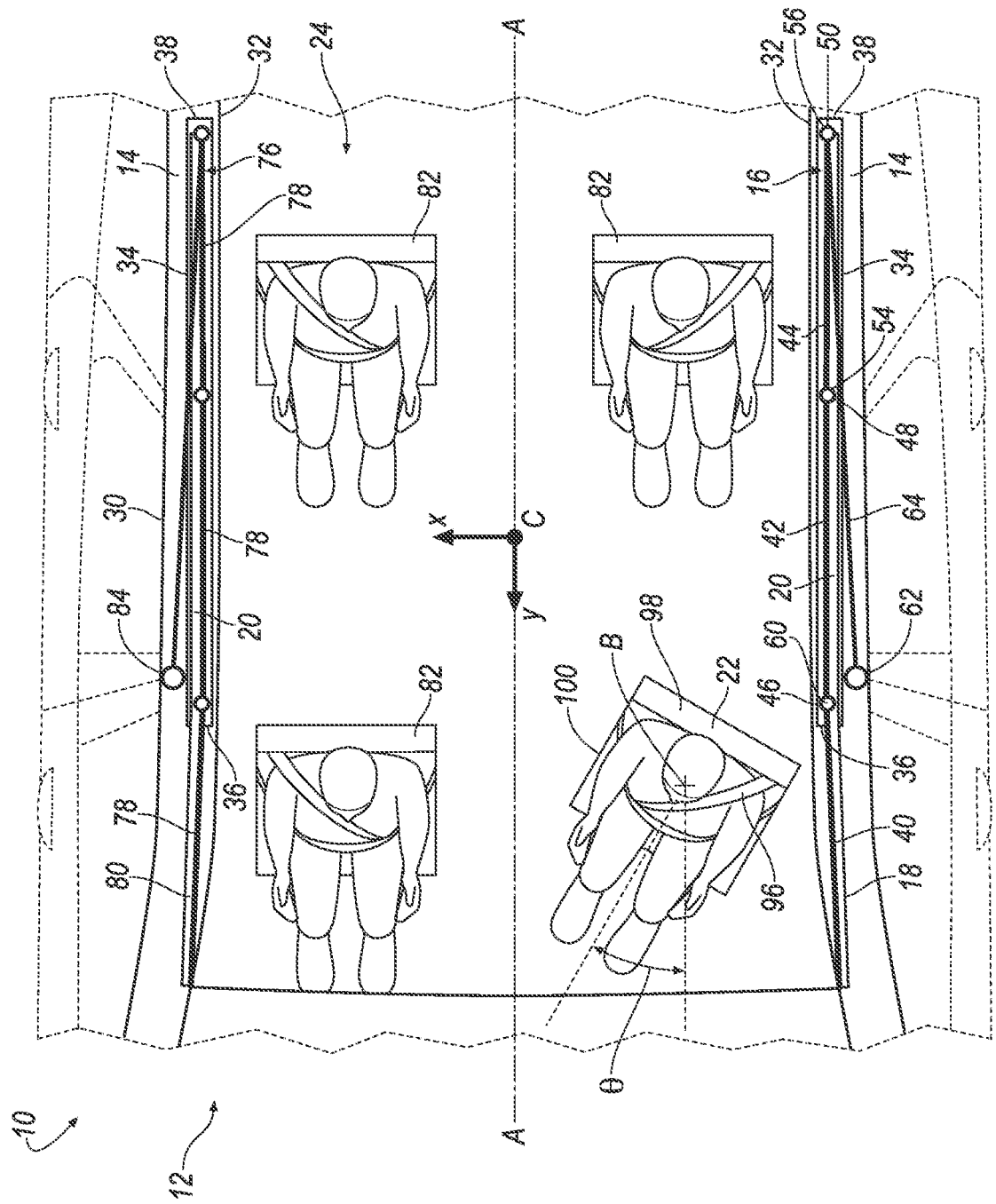
FIG. 2 is a plan view of the vehicle and a linkage supported by a roof rail.
Figure 3:
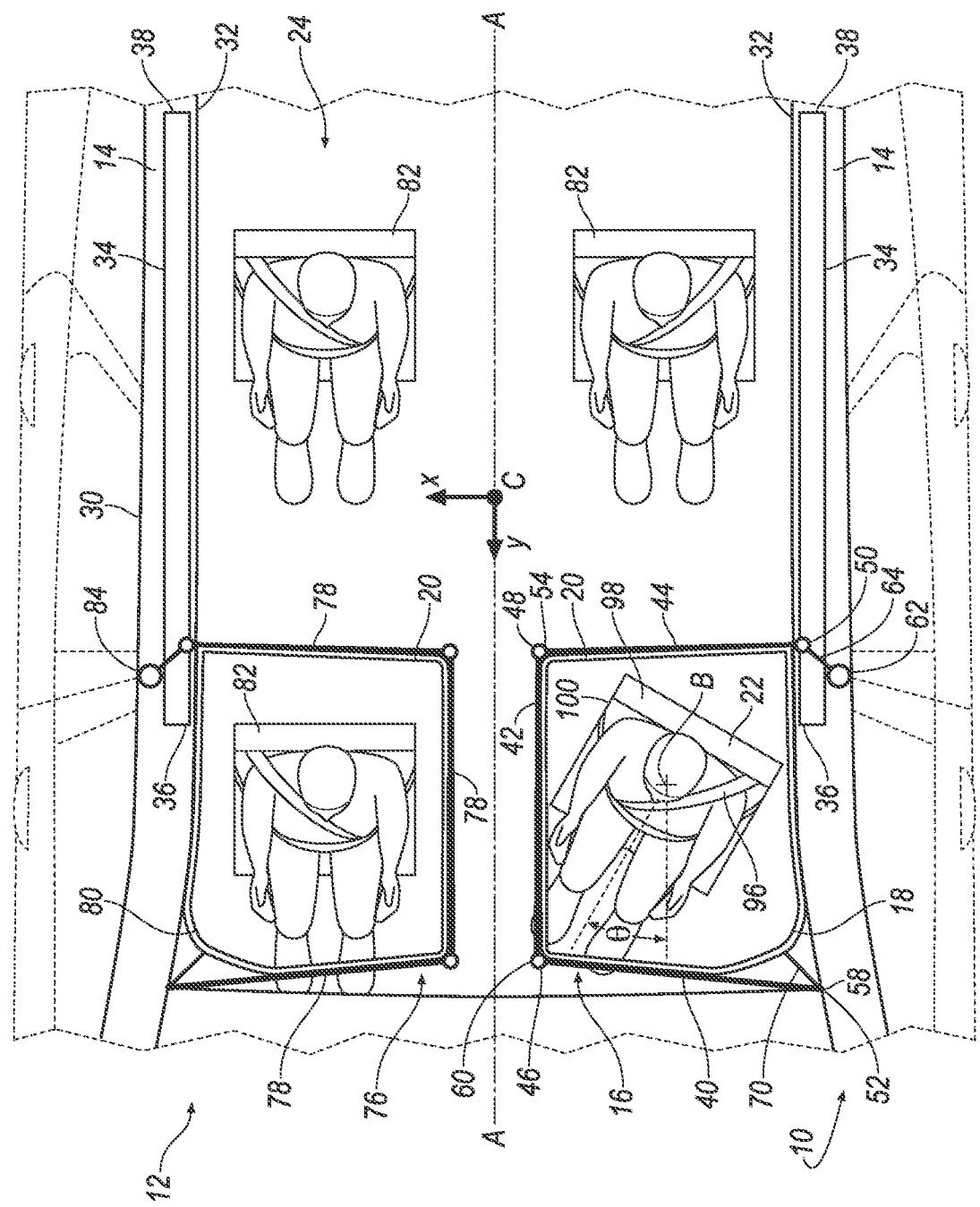
FIG. 3 is a plan view of a plurality of linkages in respective deployed positions.
Figure 6:
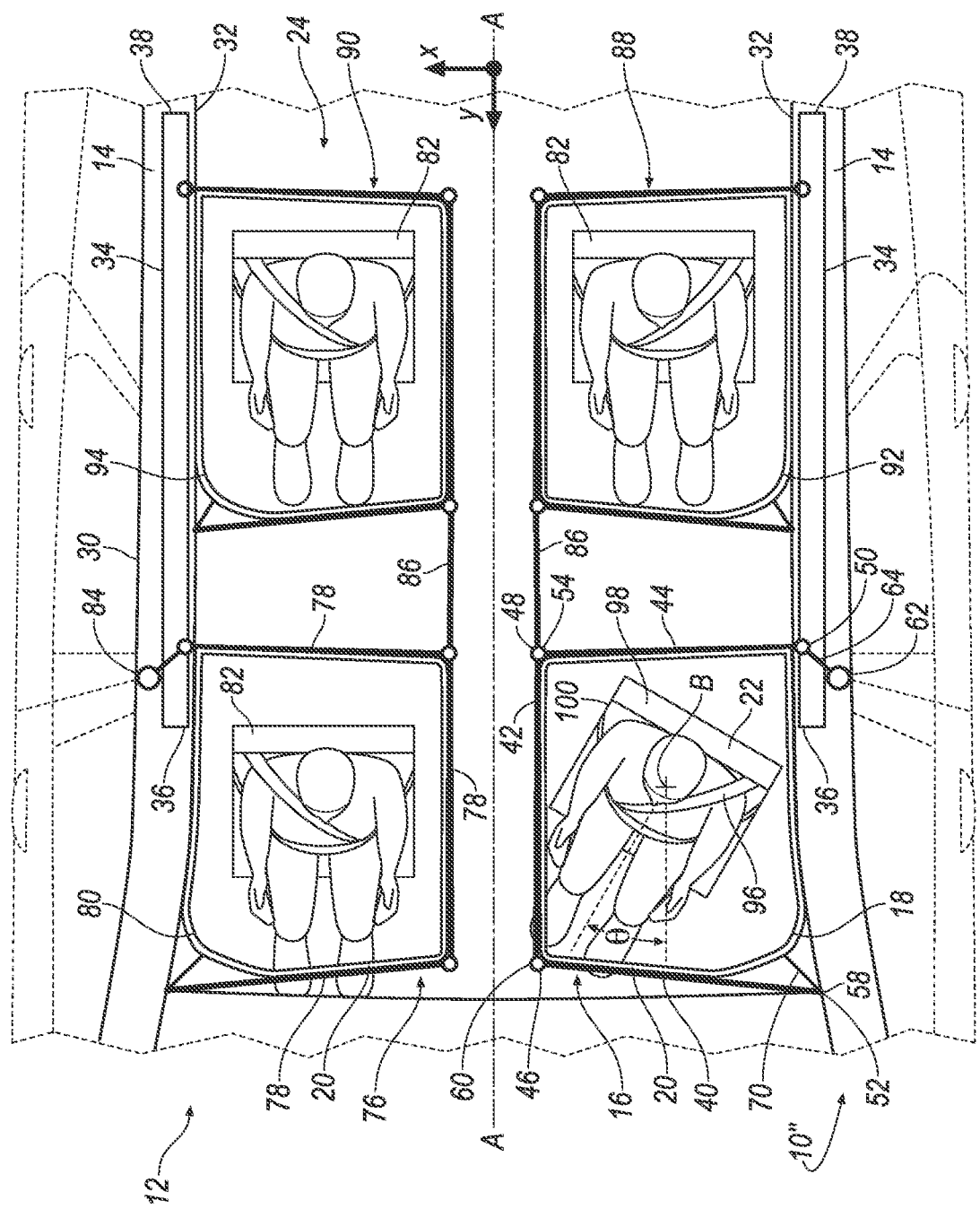
FIG. 6 is a plan view of another linkage in a deployed position.

The vehicle 12 defines a longitudinal center line A, as shown in FIGS. 2-3, 6. The longitudinal center line A is a line extending along a longitudinal axis Y of the vehicle 12. That is, the vehicle defines a lateral axis X and a longitudinal axis Y extending from a center point C. The longitudinal axis Y extends in a vehicle forward and rearward direction, and the lateral axis X extends in a cross-vehicle direction.

The assembly 10, 10', 10" includes the roof rail 14, as shown in FIGS. 1-6. The roof rail 14 is disposed in a vehicle roof 30. The roof rail 14 may be part of the body 28 in the unibody construction and part of the frame in the body-on-frame construction. When the vehicle 12 includes a moonroof or other assembly where the body 28 lacks a rail extending in the cross-vehicle direction over the passenger cabin 24, the roof rail 14 may extend along the moonroof to support the linkage 16. FIGS. 1-6 illustrate two roof rails 14 on opposing sides of the passenger cabin 24. The assembly 10 may include a headliner 32. The headliner 32 may be supported by the roof rail 14. The headliner 32 covers the roof rail 14 from occupants in the passenger cabin 24.

The roof rail 14 includes a track 34, as shown in FIGS. 2-3, 6. The track 34 may extend along the roof rail 14 from a proximal end 36 to a distal end 38. The proximal end 36 of the track 34 is disposed closer to a front of the vehicle 12 than the distal end 38. That is, the track 34 extends in a vehicle-rearward direction from the proximal end 36 to the distal end 38. The track 34 may be mounted to the roof rail 14 with, e.g., a suitable fastener. The track 34 may have a curved or square U-shaped cross section that allows the linkage 16 to slide relative to the roof rail 14.

The assembly 10, 10', 10" includes the linkage 16, as shown in FIGS. 2-6. The linkage 16 is supported by the roof rail 14. The linkage includes a plurality of links 20. The plurality of links 20 includes a first link 40 and a second link 42. That is, collectively, the links 20 are given the numeral "20," and each individual link in the Figures has a separate numeral: the first link 40, the second link 42, and a third link 44. The links 20 are rotatable relative to the roof rail 14 toward the longitudinal center line A of the vehicle. The first link 40 may be rotatably connected to the second link 42. The linkage 16 may include additional links 20, including the third link 44. The second link 42 may be rotatably connected to the third link 44. The third link 44 may be slidably connected to the roof rail 14 via, e.g., the track 34. The links 20 may be a suitable material, e.g., metal, plastic, a composite, etc.

Figure 4:
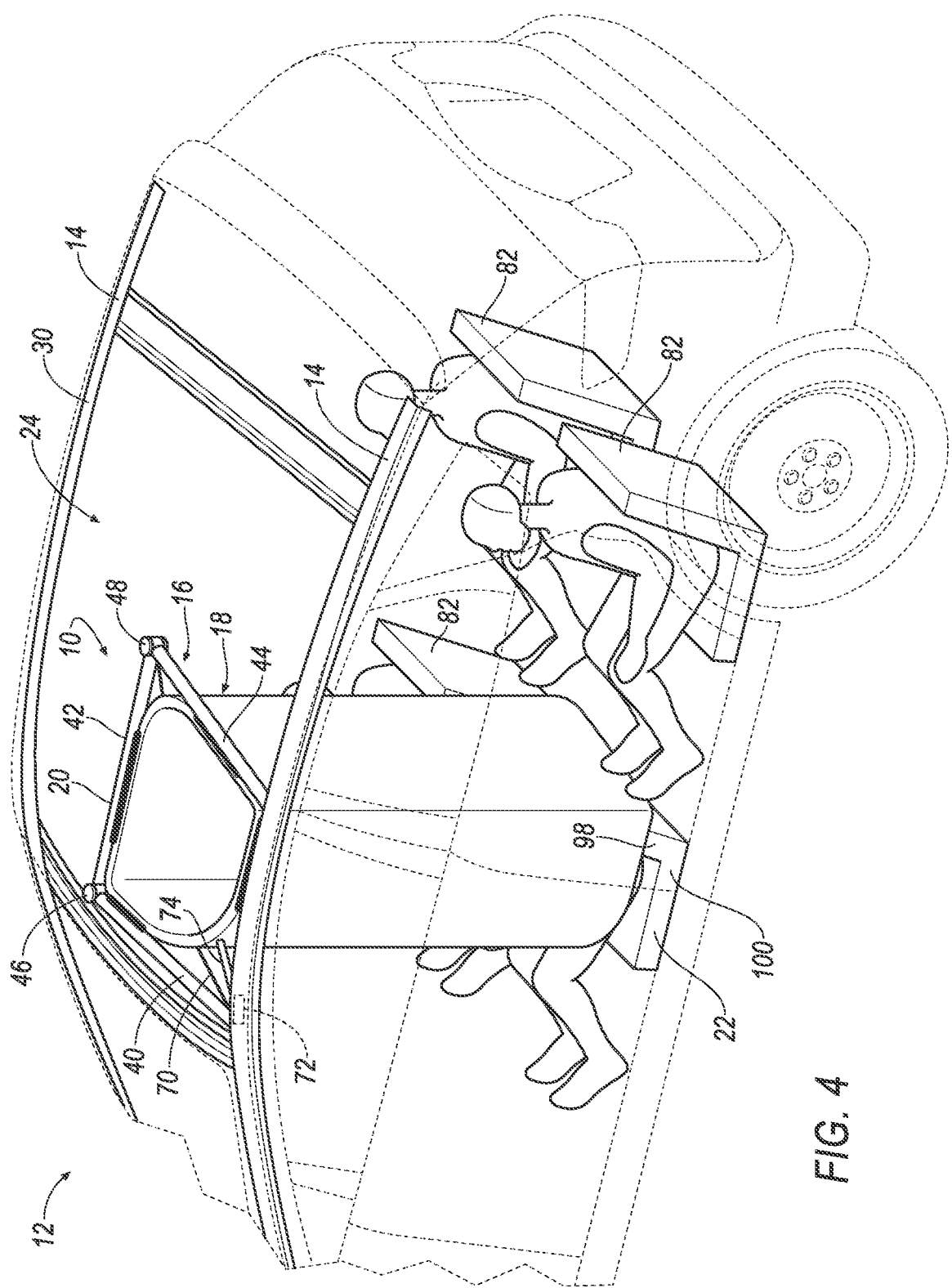
FIG. 4 is a perspective view of an airbag extending from the linkage.
Figure 5:
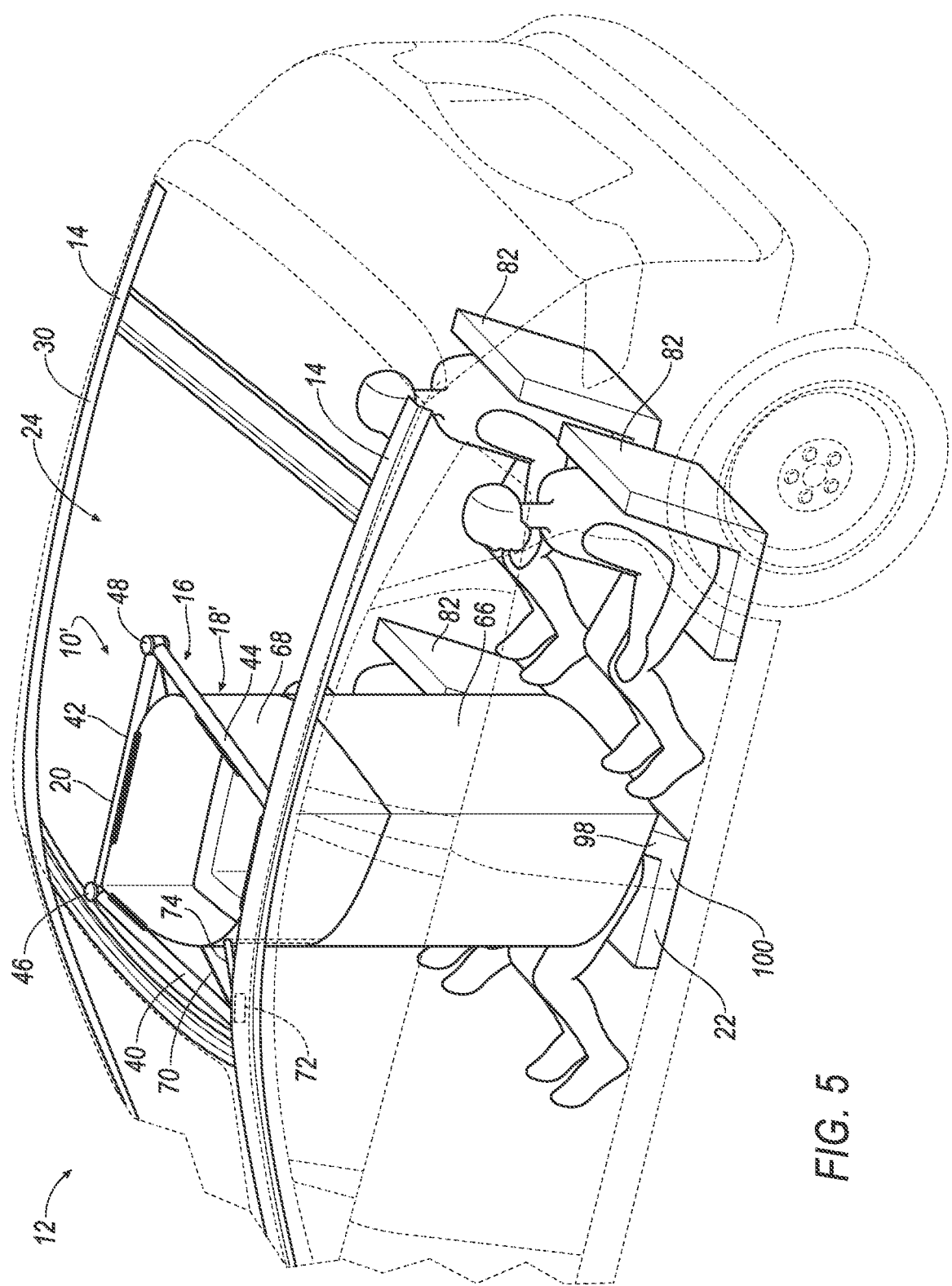
FIG. 5 is a perspective view of another airbag extending from the linkage.

The linkage 16 may be rotatable from a stowed position, as shown in FIG. 2, to a deployed position, as shown in FIGS. 3-6. In the stowed position, the linkage 16 may be disposed between the roof rail 14 and the headliner 32, out of view of occupants in the passenger cabin 24. In the deployed position, the linkage 16 may extend away from the roof rail 14 along the cross-vehicle direction and away from the headliner 32. That is, the linkage 16 may extend into the passenger cabin 24 away from the headliner 32 in the deployed position. In the deployed position, the linkage 16 forms a polygon, e.g., a quadrilateral as shown in FIGS. 3-5. The linkage 16 may include a suitable number of links 20 to form the polygon, e.g., a pentagon, an octagon, etc.

The linkage 16 may include a stop 46 between the first link 40 and the second link 42. The stop 46 may stop relative rotation of the first link 40 and the second link 42. That is, when the linkage 16 moves to the deployed position, the first link 40 and the second link 42 rotate. The stop 46 may stop relative motion of the first link 40 and the second link 42 when the linkage 16 moves to the deployed position, preventing further rotation of the first link 40 and the second link 42 away from the deployed position. The linkage 16 may include a second stop 48 between the second link 42 and the third link 44. The second stop 48 may stop relative rotation of the second link 42 and the third link 44 when the linkage 16 is in the deployed position.

The linkage 16 may be slidably connected to the track 34. The linkage 16 may have a first end 50 slidably connected to the track 34 and a second end 52 rotatably connected to the roof rail 14, the second end 52 being fixed along the roof rail 14. That is, the linkage 16 may rotate about the second end 52 as the first end 50 slides along the track 34, and the second end 52 may not move along the roof rail 14. The third link 44 of the linkage 16 may be slidably connected to the track 34. That is, the third link 44 has a first end 54 rotatably connected to the second link 42 and a second end 56 slidably connected to the track 34. In FIGS. 2-5, the second end 56 of the third link 44 is the first end 50 of the linkage 16. The first link 40 has a first end 58 rotatably connected to the roof rail 14 and a second end 60 rotatably connected to the second link 42. In FIGS. 2-5, the first end 58 of the first link 40 is the second end 52 of the linkage 16. When the linkage 16 moves from the stowed position to the deployed position, the second end 56 of the third link 44 may slide along the track 34 toward the proximal end 36 of the track 34.

The assembly 10, 10', 10" may include an actuator 62, as shown in FIGS. 2-3, 6. The actuator 62 may be supported by the roof rail 14. The actuator 62 may be arranged to rotate the linkage 16 from the stowed position to the deployed position. The actuator 62 may include a cable 64. The cable 64 is attached to the first end 50 of the linkage 16, i.e., the end of the linkage 16 slidably connected to the track 34. In FIGS. 2-3, the cable 64 is attached to the second end 56 of the third link 44. That is, the cable 64 may be arranged to slide the second end 56 of the third link 44 along the track 34 from the distal end 38 to the proximal end 36. The actuator 62 pulls the cable 64 and the linkage 16 along the track 34, deploying the linkage 16 from the stowed position to the deployed position. That is, the actuator 62 may spool the cable 64, pulling on the linkage 16 to deploy the linkage 16 to the deployed position. The actuator 62 may be any suitable type, e.g., pyrotechnic, pneumatic, hydraulic, etc.

The assembly 10, 10', 10" includes the airbag 18, 18', as shown in FIGS. 2-6. The airbag 18, 18' is supported by the linkage 16. In other words, the airbag 18, 18' moves with the linkage 16 as the linkage moves relative to the roof rail 14. The airbag 18, 18' may extend along the roof rail 14. The airbag 18, 18' is inflatable from an uninflated position to an inflated position. The airbag 18, 18' may be formed of a woven polymer or any other material. As one example, the airbag may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

In the uninflated position, the airbag 18, 18' may extend along the roof rail 14 and the linkage 16. For example, as shown in FIG. 2, the airbag 18 may extend along the roof rail 14, the first link 40, the second link 42, and the third link 44. The airbag 18, 18' may extend around the linkage 16 in the uninflated position. The links 20 of the linkage 16 are rigid relative to the airbag 18, 18'. When the linkage 16 is in the deployed position, the airbag 18, 18' may extend around the linkage 16. That is, the airbag 18, 18' may be a cylindrical tube defining an interior cavity to extend around the polygon formed by the links 20.

As shown in FIG. 5, the airbag 18' in the inflated position may include an inflatable portion 66 and an uninflatable portion 68. The uninflatable portion 68 may be mounted to the linkage 16 with, e.g., a tether 70, a fastener, etc. Alternatively or additionally, the uninflatable portion 68 may be fastened around the linkage 16, e.g., sewn about the linkage 16. The inflatable portion 66 may extend from the uninflatable portion 68. When the airbag 18' includes the uninflatable portion 68, a total amount of material required for the airbag 18' may be reduced. Alternatively, as shown in FIG. 4, the airbag 18 may be entirely inflatable, as shown in FIG. 4. In the inflated position, the airbag 18, 18' may be tubular defining an interior cavity to extend around the vehicle seat 22 and the occupant within the interior cavity. The tubular shape of the airbag 18, 18' allows the airbag 18, 18' to surround and retain the occupant and control kinematics of the occupant during the impact.

The assembly 10, 10', 10" may include an inflator 72 and a fill tube 74, as shown in FIGS. 4-5. The inflator 72 provides inflation medium to the airbag 18 through the fill tube 74. The inflator 72 may be supported by the roof rail 14. The inflator 72 may be a suitable type, e.g., pyrotechnic. The fill tube 74 may extend from the inflator 72 along the uninflatable portion 68 of the airbag 18' to the inflatable portion 66 of the airbag 18' to inflate the airbag 18' to the inflated position. Alternatively, as shown in FIG. 4, the fill tube 74 may extend directly to the airbag 18.

The vehicle 12 includes the vehicle seat 22, as shown in FIGS. 1-6. The vehicle seat 22 includes a seat back 98 and a seat bottom 100. The linkage 16 may extend over the vehicle seat 22 in the deployed position, e.g., over the seat back 98. The airbag 18, 18' may inflate toward the vehicle seat 22 from the uninflated position to the inflated position. That is, the linkage 16 may extend around the vehicle seat 22 in the deployed position and the airbag 18, 18' may extend around the vehicle seat 22 in the inflated position. The vehicle may include a plurality of vehicle seats 22, e.g., a second vehicle seat 82 as shown in FIGS. 1-6, a third vehicle seat, a fourth vehicle seat, etc. The vehicle seats 22, 82 may support additional occupants in the passenger cabin 24.

The vehicle seat 22, 82 may be rotatable. That is, each vehicle seat 22, 82 may be rotatable about an axis B, e.g., a vertical axis through the vehicle roof and vehicle floor, to a rotated position away from the forward-vehicle direction, such as the vehicle seat 22 in FIGS. 2-3, 6, defining an angle θ as shown in FIGS. 2-3, 6. For example, the vehicle seat 22, 82 may rotate between a vehicle-forward position, a vehicle-rearward position, and/or positions therebetween. In the vehicle-forward position, an occupant of the vehicle seat 22, 82 faces an instrument panel. The vehicle seat 22, 82 may rotate completely, i.e., 360°, about the axis B. The vehicle seat 22, 82 may rotate between fixed positions, e.g., the vehicle-forward position and the vehicle-rearward position or may be rotatable to an infinite number of positions.

The seat bottom 100 may include a rotatable support (not shown). The rotatable support provides the rotatability of the vehicle seat 22, 82 described above. For example, the rotatable support is rotatable between the vehicle-forward position and the vehicle-rearward position. The rotatable support supports the vehicle seat 22, 82 on the floor and allows the vehicle seat 22, 82 to rotate relative to the floor, e.g., between the vehicle-forward position and the vehicle-rearward position. The rotatable support may include, for example, a pedestal, one or more toothed rings, etc. Adjustment of the rotatable support may be manual, e.g., with a spring-loaded lever, or may be automated, e.g., with a motor and input buttons.

Each vehicle seat 22, 82 may include a seat-integrated restraint 96, e.g., a seat-integrated seat belt attached to the seat back 98 and the seat bottom 100, that controls kinematics of the occupant when the vehicle seat 22, 82 is in the rotated position. When the airbag 18, 18' is in the inflated position, the airbag 18, 18' extends around the vehicle seat 22. That is, the airbag 18, 18' may extend around the seat back 98 down the torso of the occupant. For example, the airbag 18, 18' may extends to a lap of the occupant. Alternatively, the airbag 18, 18' may extend to the torso of the occupant. Thus, the airbag 18 may control kinematics of a belted or unbelted occupant in the vehicle seat 22 in the rotated position during the impact.

The assembly 10, 10', 10" may include a second linkage 76, as shown in FIGS. 2-3, 6. The second linkage 76 may be supported by the roof rail 14. The second linkage 76 may include a plurality of links 78. The second linkage 76 may be rotatable from a stowed position to a deployed position. As shown in FIG. 3, the assembly 10 may include a second airbag 80 supported by the second linkage 76 and inflatable from an uninflated position to an inflated position. When the second linkage 76 is in the deployed position, the second linkage 76 extends around a second vehicle seat 82 and the second airbag 80 extends around the second vehicle seat 82 between the vehicle seat 22 and the second vehicle seat 82. The assembly may include a second actuator 84 that deploys the second linkage 76 to the deployed position. Alternatively, as shown in FIG. 6, the assembly 10" may include a connecting link 86 that connects the linkage 16 to the second linkage 76. When the actuator 26 deploys the linkage 16 from the stowed position to the deployed position, the connecting link 86 deploys the second linkage 76 from the stowed position to the deployed position. The assembly 10, 10', 10" may include additional linkages, as shown in FIG. 6, including a third linkage 88 and a fourth linkage 90, arranged to deploy toward each of the vehicle seats 22, 82. The assembly 10, 10', 10" may include a third airbag 92 supported by the third linkage 88 and a fourth airbag 94 supported by the fourth linkage 90. The airbags 80, 92, 94 may be entirely inflatable like the airbag 18, or the airbags 80, 92, 94 may each include respective uninflatable and inflatable portions (not shown in the Figures) like the airbag 18'. That is, each linkage 16, 76, 88, 90 may include a respective airbag 18, 18', 80, 92, 94 that extends around the respective vehicle seat 22, 82 to control kinematics of occupants in the vehicle seats 22, 82.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a roof rail extending in a longitudinal direction;
   a linkage supported by the roof rail in the longitudinal direction, the linkage including a plurality of links that are rotatable in a lateral direction relative to the roof rail; and
   an airbag supported by the linkage inflatable in a direction downward from the lateral and longitudinal directions.

2. The assembly of claim 1, further comprising a track extending along the roof rail, wherein the linkage has a first end slidably connected to the track and a second end rotatably connected to the roof rail, the second end being fixed along the rail.

3. The assembly of claim 1, wherein the plurality of links includes a first link and a second link, the first link being rotatably connected to the second link.

4. The assembly of claim 3, wherein the linkage is rotatable from a stowed position to a deployed position, wherein the linkage includes a stop between the first link to the second link and stopping relative rotation of the first link and the second link in the deployed position.

5. The assembly of claim 3, wherein the plurality of links includes a third link, the first link being rotatably connected to the roof rail and rotatably connected to the second link, the second link being rotatably connected to the third link, and the third link being slidably connected to the roof rail.

6. The assembly of claim 5, wherein the linkage is rotatable from a stowed position to a deployed position, wherein the linkage includes a stop between the first link to the second link and stopping relative rotation of the first link and the second link in the deployed position and a second stop between the second link to the third link and stopping relative rotation of the second link and the third link in the deployed position.

7. The assembly of claim 5, further comprising an actuator including a cable, the actuator supported by the roof rail, wherein the third link has a first end rotatably connected to the second link and a second end slidably connected to the roof rail and the cable is attached to the second end of the third link.

8. The assembly of claim 7, further comprising a track extending along the roof rail having a distal end and a proximal end, wherein the second end of the third link is slidably connected to the track and the cable is arranged to slide the second end of the third link along the track from the distal end to the proximal end.

9. The assembly of claim 8, wherein the linkage is rotatable from a stowed position to a deployed position, wherein when the second end of the third link is at the proximal end of the track, the linkage is in the deployed position.

10. The assembly of claim 5, wherein the airbag extends along the roof rail, the first link, the second link, and the third link.

11. The assembly of claim 10, further comprising a vehicle seat and a second vehicle seat, wherein the linkage is rotatable from a stowed position to a deployed position, wherein when the linkage is in the deployed position, the linkage extends around the vehicle seat and the airbag extends around the vehicle seat and between the vehicle seat and the second vehicle seat.

12. The assembly of claim 11, further comprising a second linkage supported by the roof rail including a plurality of links and rotatable from a stowed position to a deployed position and a second airbag supported by the second linkage and inflatable to an inflated position when the second linkage is in the deployed position, wherein when the second linkage is in the deployed position, the second airbag extends around the second vehicle seat and between the vehicle seat and the second vehicle seat.

13. The assembly of claim 1, wherein the airbag includes an uninflatable portion mounted to the linkage and an inflatable portion extending from the uninflatable portion.

14. The assembly of claim 13, further comprising an inflator and a fill tube, the inflator supported by the roof rail and the fill tube extending from the inflator along the uninflatable portion to the inflatable portion.

15. The assembly of claim 1, wherein the linkage is rotatable from a stowed position to a deployed position and the linkage extends away from the roof rail along a cross-vehicle direction in the deployed position.

16. The assembly of claim 1, further comprising a vehicle seat, wherein the airbag is inflatable to an inflated position in which the airbag extends around the vehicle seat.

17. The assembly of claim 1, wherein the airbag is inflatable from an uninflated position in which the airbag extends along the linkage and the roof rail.

18. The assembly of claim 1, further comprising a headliner supported by the roof rail, wherein the linkage is rotatable from a stowed position to a deployed position and the linkage in the stowed position is disposed between the roof rail and the headliner and the linkage extends away from the headliner in the deployed position.

19. An assembly, comprising:
    a roof rail;
    a linkage supported by the roof rail, the linkage including a plurality of links that are rotatable relative to the roof rail;
    an airbag supported by the linkage; and
    a track extending along the roof rail, wherein the linkage has a first end slidably connected to the track and a second end rotatably connected to the roof rail, the second end being fixed along the rail.

20. An assembly, comprising:
    a roof rail;
    a linkage supported by the roof rail, the linkage including a plurality of links that are rotatable relative to the roof rail; and
    an airbag supported by the linkage;
    wherein the plurality of links include a first link, a second link, and a third link, the first link being rotatably connected to the roof rail and rotatably connected to the second link, the second link being rotatably connected to the third link, and the third link being slidably connected to the roof rail.

* * * * *